UNITED STATES PATENT OFFICE.

KARL FARKAS, OF NEW YORK, N. Y., ASSIGNOR OF ONE-HALF TO GUY V. WILLIAMS, OF NEW YORK, N. Y.

PLASTIC MASS FOR METALLIC FILAMENTS.

1,041,262.  Specification of Letters Patent.  Patented Oct. 15, 1912.

No Drawing.  Application filed August 10, 1909. Serial No. 512,144.

*To all whom it may concern:*

Be it known that I, KARL FARKAS, a citizen of the Kingdom of Hungary, and a resident of New York, in the county and State of New York, have invented certain new and useful Improvements in Plastic Masses for Metallic Filaments, of which the following is a specification.

This invention has reference to improvements in the production of metallic filaments which are used in incandescent electric lamps. Such filaments consume relatively little current in comparison to carbon filaments but they are very fine and delicate. They consist of highly refractory chemical elements which are practically infusible such as, for instance, chromium and other highly refractory chemical elements and metals. It is essential for the good quality of such filaments that they consist of a pure material. It is quite difficult to remove all traces of impurities and additions during the process of manufacturing the light producing conductors and the impurities impair the light producing power and life time of the conductor and consume more current than the highly refractory elementary substance of which the filament is essentially composed. In order to obtain such metallic filaments of uniform homogeneous structure it is important that the powder from which they are made is very fine and pure and imperceptible to touch. Such fine powders are preferably mixed with suitable salts of highly refractory elements before a plastic mass for producing the filaments is prepared.

In carrying the present invention into effect I substantially proceed as follows: Specially prepared black impalpable powder of chromous oxids for instance is mixed with about 15% of sulfate of molybdenum and the mixture reduced to fine powder in presence of an organic liquid adapted to be evaporated or incorporated therewith. Such liquid is for instance, ether-alcohol which is easily evaporated during the process of rubbing the sulfate into the black chromous oxids. I may also employ a rubber solution. When the solvent of said solution is evaporated the rubber remains therein as a binding material. The rubbing of these various components with such organic liquid is continued until a somewhat plastic mass remains which then is pressed into filaments in the usual manner.

The sulfate of molybdenum is mixed with the black impalpable powder of chromous oxid and an organic binder for the purpose of obtaining a smooth and uniform mass from which filaments are easily pressed in a perfect condition without any little cracks therein. Filaments having such fine cracks break easily during the subsequent treatment and such fine cracks are certainly enlarged when such filaments are baked in a common furnace. In addition thereto the finished filament does not contain any easily fusible elementary substance or metal because the remaining molybdenum is, like the chromium of a highly refractory character. The filaments thus obtained are carbonized in a common furnace whereby volatile substances are driven off. These filaments are then finally reduced to the elementary substances by heating them electrically in an attenuated atmosphere of hydrogen. These filaments when electrically heated become hardened and very tough and may easily be handled during the process of manufacturing incandescent lamps.

I claim as my invention:

1. The process of producing a plastic mass for producing metallic filaments for incandescent electric lamps consisting in mixing black fine impalpable powder of chromous oxids with some sulfate of a highly refractory element in presence of an organic liquid preparation composed essentially of a volatile liquid substance, and rubbing said mixture until a plastic mass results.

2. The process of producing a plastic mass for producing metallic filaments for incandescent electric lamps consisting in mixing black impalpable powder of chromous oxids with some sulfate of molybdenum in presence of an organic liquid preparation composed essentially of a volatile liquid substance, and rubbing said mixture until a plastic mass results.

3. The process of producing a plastic mass for producing metallic filaments for incandescent electric lamps consisting in mixing black impalpable powder of chromous oxids with about 15% of sulfate of molybdenum in presence of an organic liquid preparation composed essentially of a volatile liquid substance, and rubbing said mixture until a plastic mass results.

4. The process of producing a plastic mass for producing metallic filaments for incandescent electric lamps consisting in mixing black impalpable powder of chromous oxids with about 15% of sulfate of molybdenum in presence of a rubber solution, and rubbing said mixture until a plastic mass results.

5. A plastic mass for producing metallic filaments for incandescent lamps consisting of fine impalpable powder of chromous oxids, a sulfate of a highly refractory element, and an organic liquid preparation composed essentially of a volatile liquid substance.

6. A plastic mass for producing metallic filaments for incandescent lamps consisting of fine impalpable powder of chromous oxids, a sulfate of molybdenum, and an organic liquid preparation composed essentially of a volatile liquid substance.

7. A plastic mass for producing metallic filaments for incandescent lamps consisting of fine impalpable powder of chromous oxids, about 15% of sulfate of molybdenum, and an organic liquid preparation composed essentially of a volatile liquid substance.

8. A plastic mass for producing metallic filaments for incandescent lamps consisting of fine impalpable powder of chromous oxids, about 15% of sulfate of molybdenum, and a rubber solution.

Signed at New York, N. Y., this 9th day of August, 1909.

KARL FARKAS.

Witnesses:
 LUDWIG K. BOHM,
 GUY V. WILLIAMS.